US008363155B2

(12) United States Patent
Tsubusaki

(10) Patent No.: US 8,363,155 B2
(45) Date of Patent: Jan. 29, 2013

(54) AUTOMATIC FOCUSING APPARATUS

(75) Inventor: Akihiro Tsubusaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 12/574,048

(22) Filed: Oct. 6, 2009

(65) Prior Publication Data

US 2010/0085470 A1 Apr. 8, 2010

(30) Foreign Application Priority Data

Oct. 7, 2008 (JP) ................................. 2008-260419

(51) Int. Cl.
G03B 13/00 (2006.01)
H04N 5/232 (2006.01)

(52) U.S. Cl. ......................... 348/357; 348/345; 348/347
(58) Field of Classification Search .................... 348/357
See application file for complete search history.

(56) References Cited

U.S. PATENT DOCUMENTS

| 4,764,787 | A  | * | 8/1988  | Hamada et al. | 396/96  |
|-----------|----|---|---------|---------------|---------|
| 5,101,277 | A  | * | 3/1992  | Kanata        | 348/349 |
| 5,430,483 | A  | * | 7/1995  | Haruki        | 348/349 |
| 6,892,028 | B2 | * | 5/2005  | Kashiwaba et al. | 348/345 |
| 6,972,799 | B1 | * | 12/2005 | Hashimoto     | 348/350 |
| 7,515,820 | B2 | * | 4/2009  | Nakai et al.  | 348/345 |
| 2005/0128339 | A1 | * | 6/2005 | Masuda       | 348/345 |
| 2006/0152617 | A1 | * | 7/2006 | Konishi      | 348/345 |

FOREIGN PATENT DOCUMENTS

| JP | 05-145827 | A |   | 6/1993 |
|----|-----------|---|---|--------|
| JP | 06-153592 | A |   | 5/1994 |
| JP | 06153592  | A | * | 5/1994 |
| JP | 10-170974 | A |   | 6/1998 |
| JP | 10170974  | A | * | 6/1998 |
| JP | 11-155094 |   |   | 6/1999 |
| JP | 2004-109690 | A |  | 4/2004 |
| JP | 2007-071988 | A |  | 3/2007 |
| JP | 2008-203791 | A |  | 9/2008 |
| JP | 2008203791 | A | * | 9/2008 |

OTHER PUBLICATIONS

JP2008-203791-A—Machine Translation.*
JP06-153592-A—Machine Translation.*
JP10-170974-A—Machine Translation.*
Japanese Office Action for corresponding application No. 2008-260419 dated Jun. 5, 2012.

* cited by examiner

Primary Examiner — Sinh Tran
Assistant Examiner — Jason Flohre
(74) Attorney, Agent, or Firm — Carter, DeLuca, Farrell & Schmidt LLP

(57) ABSTRACT

An automatic focusing apparatus for performing focus adjustment of an object image includes an image pickup portion, an evaluating portion, a focus motor for driving a focus lens, and drive controlling portion. The image pickup portion converts an optical signal of an object image into an electric video signal. The evaluating portion calculates an evaluation value from the video signal obtained by the image pickup portion. The drive controlling portion controls an acceleration/deceleration drive of the focus motor according to a acceleration/deceleration function. The drive controlling portion accelerates the drive of the focus motor up to a target velocity, and decelerates the drive of the focus motor from the target velocity after the target velocity is reached, in synchronization with a synchronization signal for generating a timing of starting exposure for the optical signal of the image pickup portion.

9 Claims, 8 Drawing Sheets

AUTOMATIC FOCUSING APPARATUS

BACKGROUND OF THE INVENTION

1. Field of the Invention

The present invention relates to an automatic focusing apparatus usable in an image pickup apparatus such as a digital camera.

2. Related Background Art

Heretofore, in an automatic focusing (AF) apparatus, a contrast detecting method, in which a contrast of a video signal of an object image is detected to execute focusing operation, has been widely used. In the contrast detecting method, a phenomenon that the contrast of the video signal increase as a focus state approaches an in-focus condition is used. In other words, while a focus lens is moved, a position (focus position) of the focus lens corresponding to a peak of a contrast value (AF evaluation value) is detected. A solid state image sensing element, such as CCD and CMOS, is used as a device for converting an optical signal of the object image into an electric video signal, and the contrast value can be acquired by extracting a high frequency component from the video signal. Meanwhile, the focus lens is driven when a lens holder with lenses fixed thereto is driven in a lens barrel by a driving source, such as a focus motor like a stepping motor, a linear motor or the like, through a mechanical system such as a nut, a screw and the like.

In an image pickup apparatus such as a digital camera, AF control, automatic exposure control, flashlight regulation control and the like are executed after a user pushes down a release button, and hence a release time lag occurs until photographing actually starts. Heretofore, techniques for reducing the release time lag have been developed to make it possible for a user to shoot without stress. Also with respect to the AF control, techniques for decreasing an AF time while improving an AF precision have been proposed. In Japanese Patent Laid-open No. Heisei-11 (1999)-155094, the following method is disclosed. In this method, when the AF evaluation value is acquired while the focus lens is moved, a driving velocity of the lens is calculated from a sampling frequency of the AF evaluation value and the total distance moving amount of the lens. And, the AF evaluation value is acquired while the lens is driven at the calculated velocity.

However, when the focus motor for driving the focus lens starts to be moved from a standstill condition, there is a possibility that the mechanical system cannot follow the motion of the focus motor due to adverse effects of inertia force and frictional force if the driving velocity is abruptly raised up to a certain velocity or more. Also in the stepping motor, if its drive is executed at a velocity above a certain velocity (a frequency of starting characteristics), a step-out phenomenon is likely to occur. Hence, the position of the focus lens is liable to be erroneously controlled.

Owing to characteristics of the motor, when acceleration operation is performed by gradually raising the velocity from a velocity below the velocity of the frequency of starting characteristics, a maximum velocity can be further increased. In the AF control, however, when the acceleration operation is performed, the displacement amount of the position of the focus lens varies if the AF evaluation value is acquired at a constant sampling period. Accordingly, it is likely that a position of the focus lens corresponding to a peak value of the AF evaluation value cannot be accurately calculated. Further, also when the lens is brought to a standstill, the step-out phenomenon is similarly likely to occur if the maximum velocity is abruptly brought to a standstill. Therefore, the velocity needs to be brought to a standstill through a deceleration operation without step-out phenomenon.

SUMMARY OF THE INVENTION

According to one aspect, the present invention provides an automatic focusing apparatus for performing focus adjustment of an object image by driving a focus lens along an optical-axis direction, which includes an image pickup portion, an evaluating portion, a focus motor, and a drive controlling portion. The image pickup portion converts an optical signal of an object image into an electric video signal by an image sensing element. The evaluating portion calculates an evaluation value from the video signal obtained by the image pickup portion. The focus motor drives the focus lens. The drive controlling portion controls an acceleration/deceleration (acceleration or deceleration) drive of the focus motor according to a predetermined acceleration/deceleration function. Further, the drive controlling portion accelerates the drive of the focus motor up to a target velocity in synchronization with a synchronization signal for generating a timing of starting exposure for the optical signal of the image pickup portion, and decelerates the drive of the focus motor from the target velocity after the target velocity is reached.

According to the present invention, an AF control time can be decreased since the acceleration/deceleration drive of the focus motor is executed. Further, since the acceleration/deceleration drive is performed using a predetermined acceleration/deceleration function, the position of the focus lens at the time when the evaluation value is acquired can be preferably calculated. Thus, a precise AF control can be achieved. Moreover, when the acceleration/deceleration function used in the acceleration/deceleration method is changed according to a situation, it is possible to more effectively decrease the AF time without lowering the AF precision.

Further features of the present invention will become apparent from the following description of exemplary embodiments, with reference to the attached drawings.

DETAILED DESCRIPTION OF THE EMBODIMENTS

Figure 1:
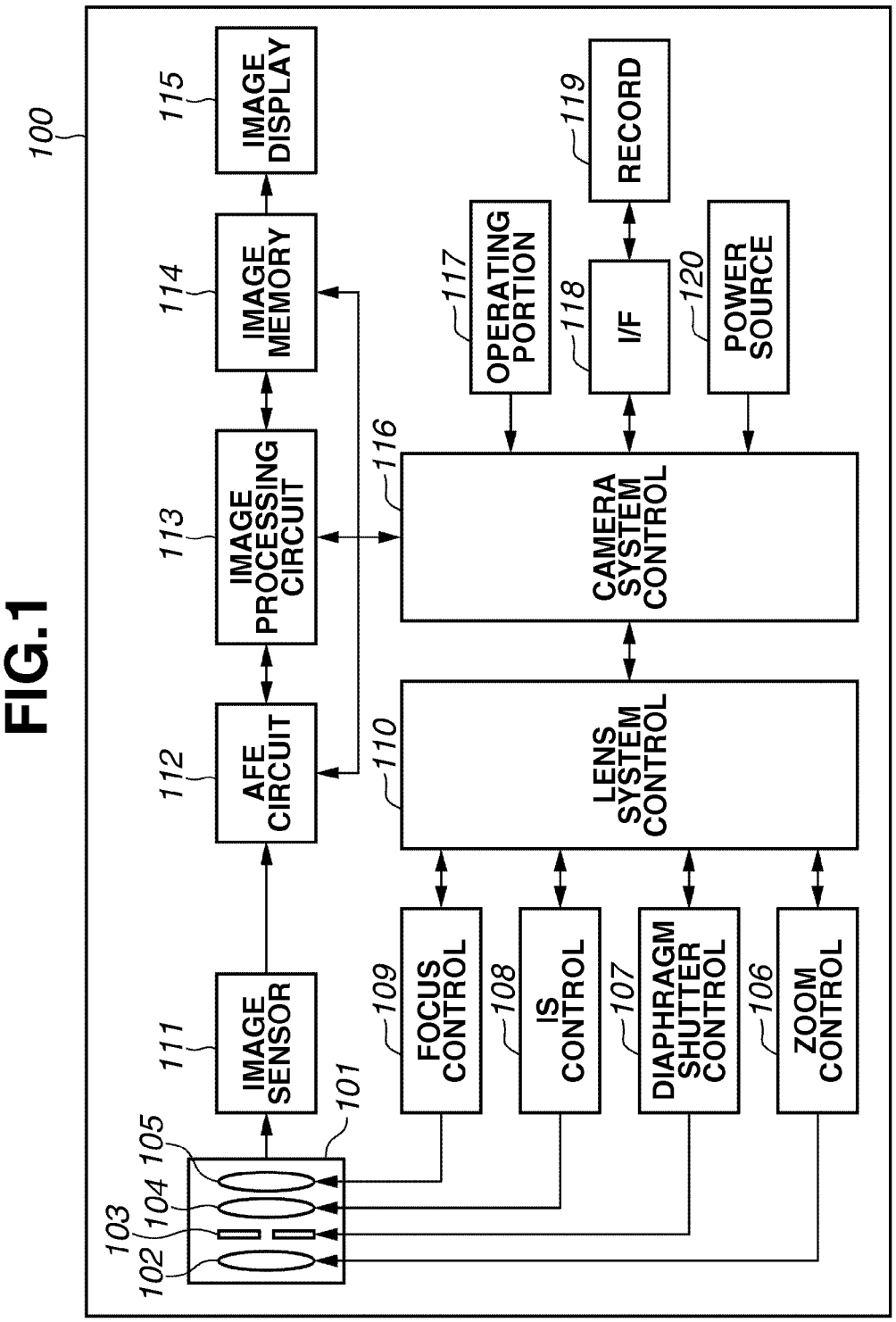
FIG. 1 is a block diagram illustrating an image pickup apparatus of the present invention.

Embodiments of the present invention will hereinafter be described. An important point of the automatic focusing apparatus of the present invention is as follows. That is, a focus lens is driven by the acceleration/deceleration drive of the focus motor according to a predetermined acceleration/deceleration function. It is thereby possible to calculate the position of the focus lens during the AF control based on the acceleration/deceleration function. Accordingly, the position of the focus lens corresponding to an evaluation value acquired at any timing can be seized. Therefore, the focus position corresponding to a peak value of the AF evaluation value can be accurately detected. Based on this fundamental concept of the present invention, a fundamental embodiment of the automatic focusing apparatus according to the present invention has a construction described above in the summary of the invention. The above-described drive controlling portion can be achieved by a portion for executing the drive controlling operation provided in a CPU, for example.

Based on the fundamental construction, the following specific constructions can be provided. The drive controlling portion can continuously perform the acceleration/deceleration drive of the focus motor according to the acceleration/deceleration function (see embodiments of FIGS. 3 and 4 described below). Naturally, it is also possible to intermittently (for example, in a stepwise manner) perform the acceleration/deceleration drive (see an embodiment of FIG. 2 described below).

The drive controlling portion can control the acceleration/deceleration drive of the focus motor in such a manner that the velocity of the focus motor is accelerated up to the target velocity, and decelerated from the target velocity after the target velocity is reached, in synchronization with the synchronization signal in a vertical synchronization time of the image sensing element determined by the synchronization signal.

Further, the drive controlling portion can control the acceleration/deceleration drive of the focus motor in such a manner that the velocity of the focus motor is accelerated up to the target velocity, and decelerated from the target velocity after the target velocity is reached, in synchronization with the synchronization signal in a charge sweep time within the vertical synchronization time determined from an exposure time determined by an exposure controlling portion for calculating the exposure amount of the image pickup portion. Here, typically, the vertical synchronization time is determined from an interval between adjacent synchronization signals, and the exposure time and the charge sweep time share the vertical synchronization time.

Further, the drive controlling portion can control the acceleration/deceleration drive of the focus motor in such a manner that the velocity of the focus motor is accelerated up to the target velocity, and decelerated from the target velocity in a stepwise manner after the target velocity is reached, in a stepwise manner in synchronization with the synchronization signal over plural vertical synchronization times.

The apparatus can further include a detecting portion for detecting the position of the focus lens, and a first calculating portion for calculating the position of the focus lens, at which the evaluating portion acquires the evaluation value, based on a signal from the detecting portion. The first calculating portion calculates positions of the focus lens corresponding to respective evaluation values obtained during the acceleration/deceleration drive, by using the acceleration/deceleration function of the drive controlling portion. Here, when the focus motor is a stepping motor, the detecting portion can be comprised of a counter for counting pulses from the stepping motor, and the first calculating portion can calculate the position of the focus lens from the position of the pulse. The detecting portion and the first calculating portion can be comprised of a detection executing portion and a calculation executing portion in a camera system control portion described below, respectively.

The drive controlling portion can be constructed in a such a manner that a first peak-position detecting mode (a coarse scan) and a second peak-position detecting mode (a fine scan) can be selectively executed (see an embodiment of FIGS. 7A and 7B described below). In the first peak-position detecting mode, the focus lens is moved at a first target velocity to coarsely detect the focus position. In the second peak-position detecting mode, the focus lens is moved at a second target velocity lower than the first target velocity around the focus position detected in the first peak-position detecting mode to detect the focus position more accurately, for example.

Further, the drive controlling portion can also be constructed as follows. That is, when the first peak-position detecting mode is performed, the drive controlling portion controls the acceleration/deceleration drive of the focus motor in such a manner that the velocity of the focus motor is accelerated up to the target velocity, and decelerated from the target velocity after the target velocity is reached, in synchronization with the synchronization signal in the vertical synchronization time of the image sensing element, or in the charge sweep time within the vertical synchronization time determined from the exposure time. The exposure time is determined by the exposure controlling portion for calculating the exposure amount of the image pickup portion.

Figure 8:
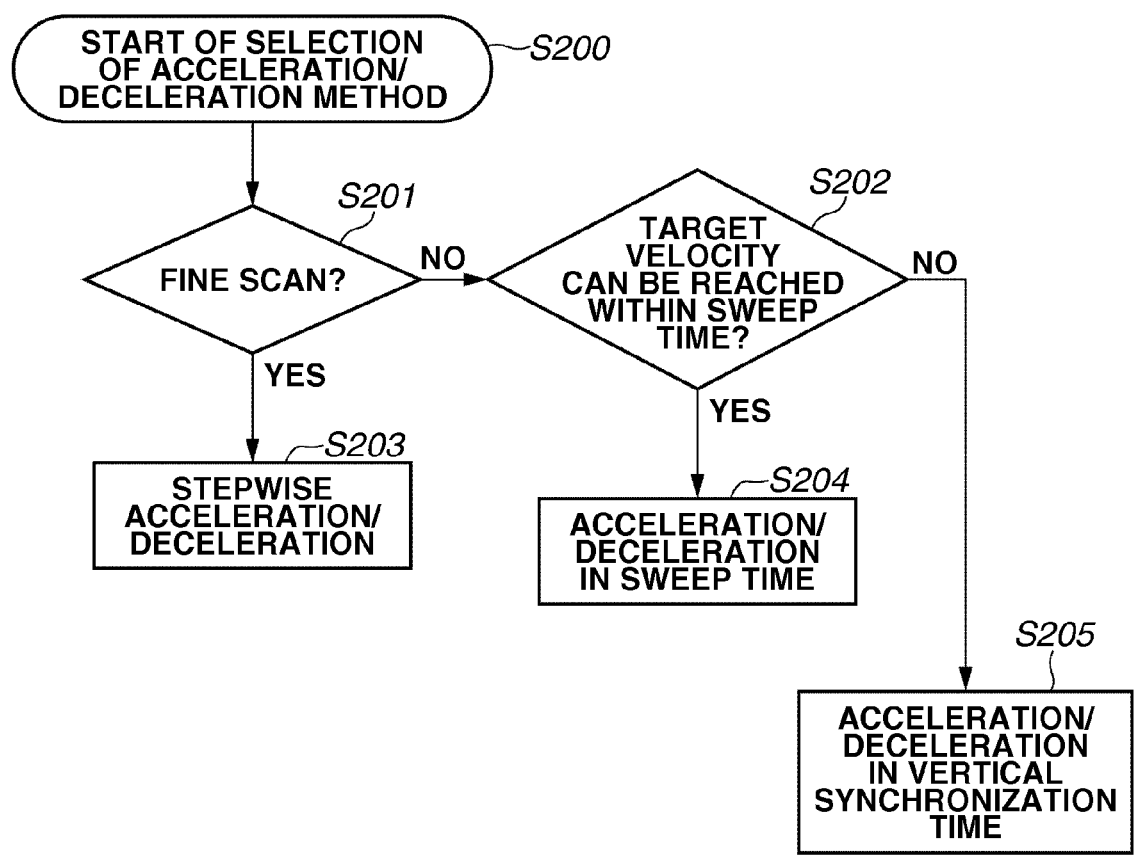
FIG. 8 is a flowchart of a selection process in an acceleration/deceleration method.

On the other hand, when the second peak-position detecting mode is performed, the drive controlling portion controls the acceleration/deceleration drive of the focus motor in such a manner that the velocity of the focus motor is accelerated up to the target velocity, and decelerated from the target velocity in a stepwise manner after the target velocity is reached, in synchronization with the synchronization signal in a stepwise manner over plural vertical synchronization times of the image sensing element (see an embodiment of FIG. 8 described below).

Furthermore, the drive controlling portion can be constructed in such a manner that first acceleration/deceleration mode and second acceleration/deceleration mode can be selectively executed. In the first acceleration/deceleration mode, the velocity of the focus motor is accelerated up to the target velocity, and decelerated from the target velocity after the target velocity is reached, in synchronization with the synchronization signal in the vertical synchronization time of the image sensing element. In the second acceleration/deceleration mode, the velocity of the focus motor is accelerated up to the target velocity, and decelerated from the target velocity after the target velocity is reached, in synchronization with the synchronization signal in the charge sweep time within the vertical synchronization time of the image sensing element determined from the exposure time. The exposure time is determined by the exposure controlling portion for calculating the exposure amount of the image pickup portion.

The drive controlling portion selects the first acceleration/deceleration mode or the second acceleration/deceleration mode, based on times calculated by a second calculating portion, in which the target velocity is reached in the first acceleration/deceleration mode and the second acceleration/deceleration mode, respectively, and the charge sweep time of the image sensing element. The second calculating portion can also be comprised of a calculation executing portion in the camera system control portion described in detail below.

More specific embodiments of the present invention will be described with reference to the drawings.

FIG. 1 shows an image pickup apparatus 100, such as a digital camera, of a preferable embodiment of the present invention. In FIG. 1, reference numeral 101 designates a lens barrel. The lens barrel 101 includes a zoom lens 102 for changing an angle of view by adjusting a focal length, a diaphragm shutter 103 for executing an exposure function by adjusting the quantity of light, an image stabilizing lens 104, and a focus lens 105. The image stabilizing lens 104 is driven in such a direction that image vibration is compensated for to achieve an anti-vibration function, and the focus lens 105 performs a focus adjustment. Reference numeral 106 designates a zoom control portion for controlling the zoom lens 102, and reference numeral 107 designates a diaphragm shutter control portion for controlling the diaphragm shutter 103. Further, reference numeral 108 designates an image stabilizer (IS) control portion for controlling the image stabilizing lens 104, and reference numeral 109 designates a focus control portion for controlling the focus lens 105.

A lens system control portion 110 receives a lens control command from a camera system control portion 116, and supplies commands to respective control portions. The above-described drive controlling portion for performing the acceleration/deceleration drive of the focus motor constituting the focus control portion 109 according to an acceleration/deceleration function includes a portion of the lens system control portion 110 and a portion of the camera system control portion 116. Each of the lens system control portion 110 and the camera system control portion 116 further includes the exposure controlling portion for calculating the exposure amount of the image sensing element 111 constituting the image pickup portion. The charge sweep time for sweeping charge of the image sensing element 111 in the vertical synchronization time is determined from the exposure time determined in the above manner, in synchronization with the synchronization signal.

Light passing through the lens barrel 101 is received by the image sensing element 111, such as CCD or CMOS, and the optical signal is converted into the electric signal. An analog front end (AFE) circuit 112 is comprised of a timing pulse generating (TG) circuit, a correlated double sampling (CDS) circuit, an analog-to-digital (AD) converter, and the like. The analog electric signal generated by the image sensing element 111 is converted into the digital signal at a given sampling period. From the timing pulse, the synchronization signal for generating the timing of starting exposure for the optical signal of the image sensing element constituting the image pickup portion, and the like are generated.

Further, the digital signal is supplied to the image processing circuit 113, and pixel interpolating process and color converting process are executed. The thus-processed signal is transferred to an image memory 114, such as DRAM or SRAM, as image data. Further, the image processing circuit 113 includes an evaluating portion that detects a high frequency component in the electric image data by a high-pass filter, and transfers the high frequency component to the camera system control portion 116 as AF evaluation value.

An image display portion 115 is comprised of TFT-LCD (a thin-film transistor driving type liquid crystal display) or the like, and displays given information (for example, photographing information), as well as image data obtained by photographing. Further, an electronic finder function can be achieved by successively displaying image information generated from signals supplied from the image sensing element 111 with the image display portion 115.

The camera system control portion 116 supplies control commands to peripheral devices according to an operation by a user. In a photographing operation, when a release button in an operating portion 117 is pushed down, the control portion 116 causes the diaphragm shutter control portion 107 to set the diaphragm position through the lens system control portion 110 so that an optimum exposure value, or an exposure value set by a user can be achieved. Further, the control portion 116 sets a gain for an AFE circuit 112, and sets the exposure time by the electronic shutter control. Furthermore, the control portion 116 acquires the AF evaluation value corresponding to each lens position while causing the focus control portion 109 to drive the focus lens 105, and moves the focus lens 105 to a focus position (in-focus position) at which the AF evaluation value peaks. The AF control can be thus achieved to obtain an optimum focused condition. Under such a condition, exposure of the image sensing element 111 is started, and after the lapse of a predetermined time the mechanical shutter 103 is closed to finish the exposure. Image data thus generated is recorded in a record medium connected through an interface (I/F) 118. A recording portion 119 is a recording device for controlling the record medium such as a memory card composed of flash memory. The record medium can be a memory area built in the camera 100.

A power source 120 is comprised of a battery detecting circuit, a DC-DC converter, a switching circuit for switching over a block to which power is supplied, and the like. The power source 120 detects presence or absence of the battery, kind of the battery, residual amount of the battery, and the like. Based on a result of such detection and the command from the camera system control portion 116, the DC-DC converter is controlled, and necessary voltage or current is supplied to portions, including the record medium, for a necessary period.

Figure 2:
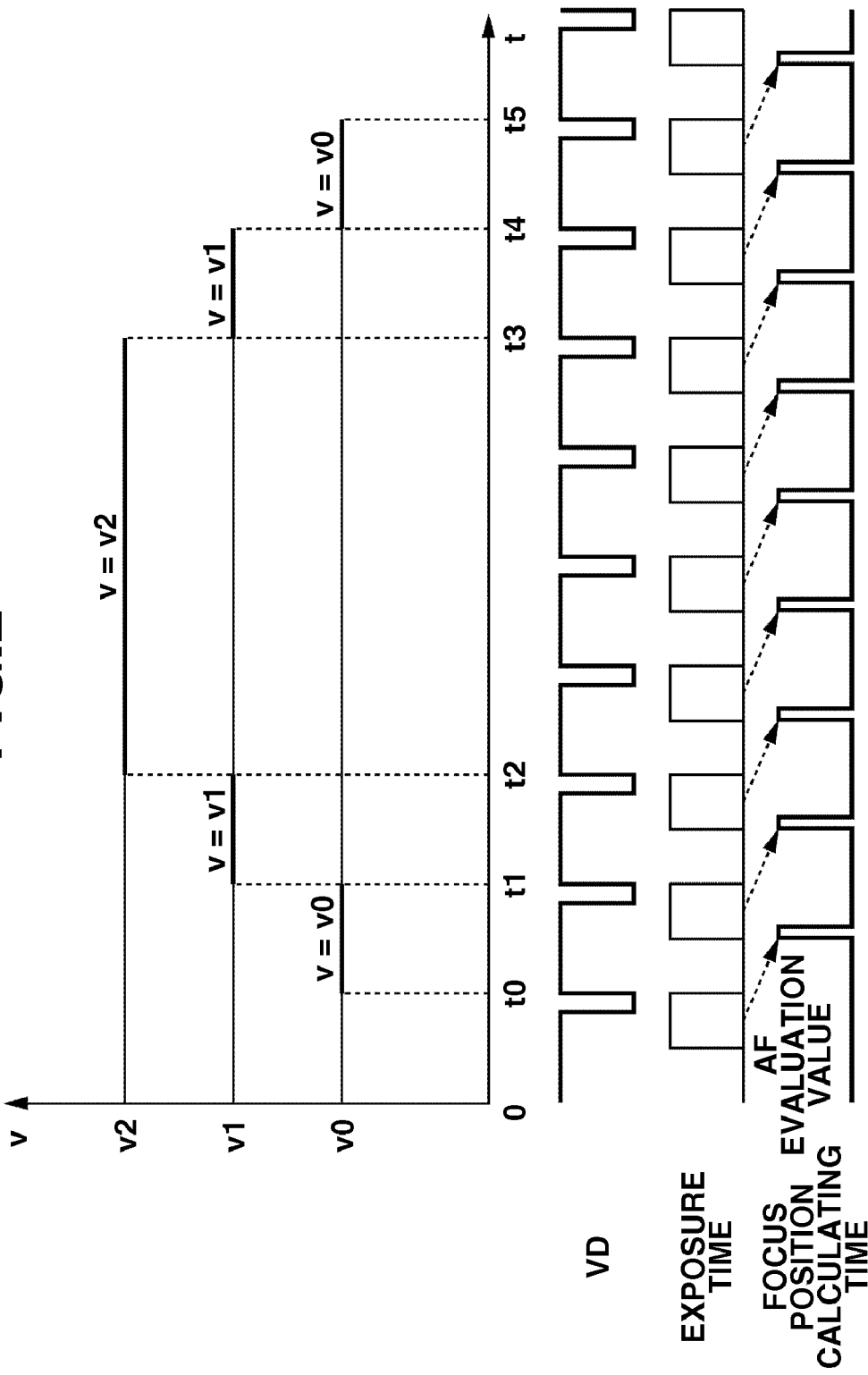
FIG. 2 is a view illustrating a change in velocity of a focus lens and the like achieved by a stepwise acceleration/deceleration function.
Figure 3:
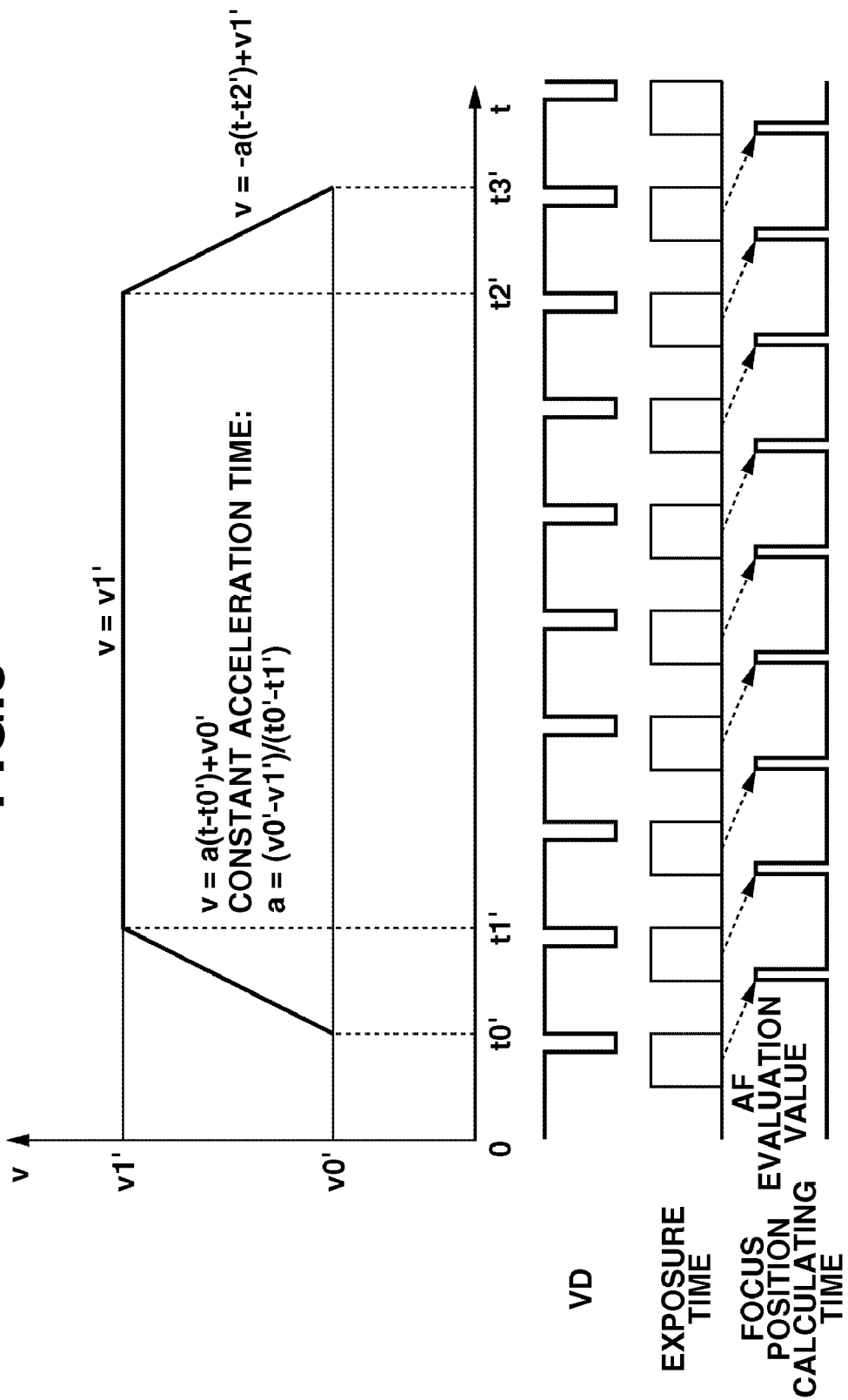
FIG. 3 is a view illustrating a change in velocity of a focus lens and the like achieved by a vertical synchronization time acceleration/deceleration function.
Figure 4:
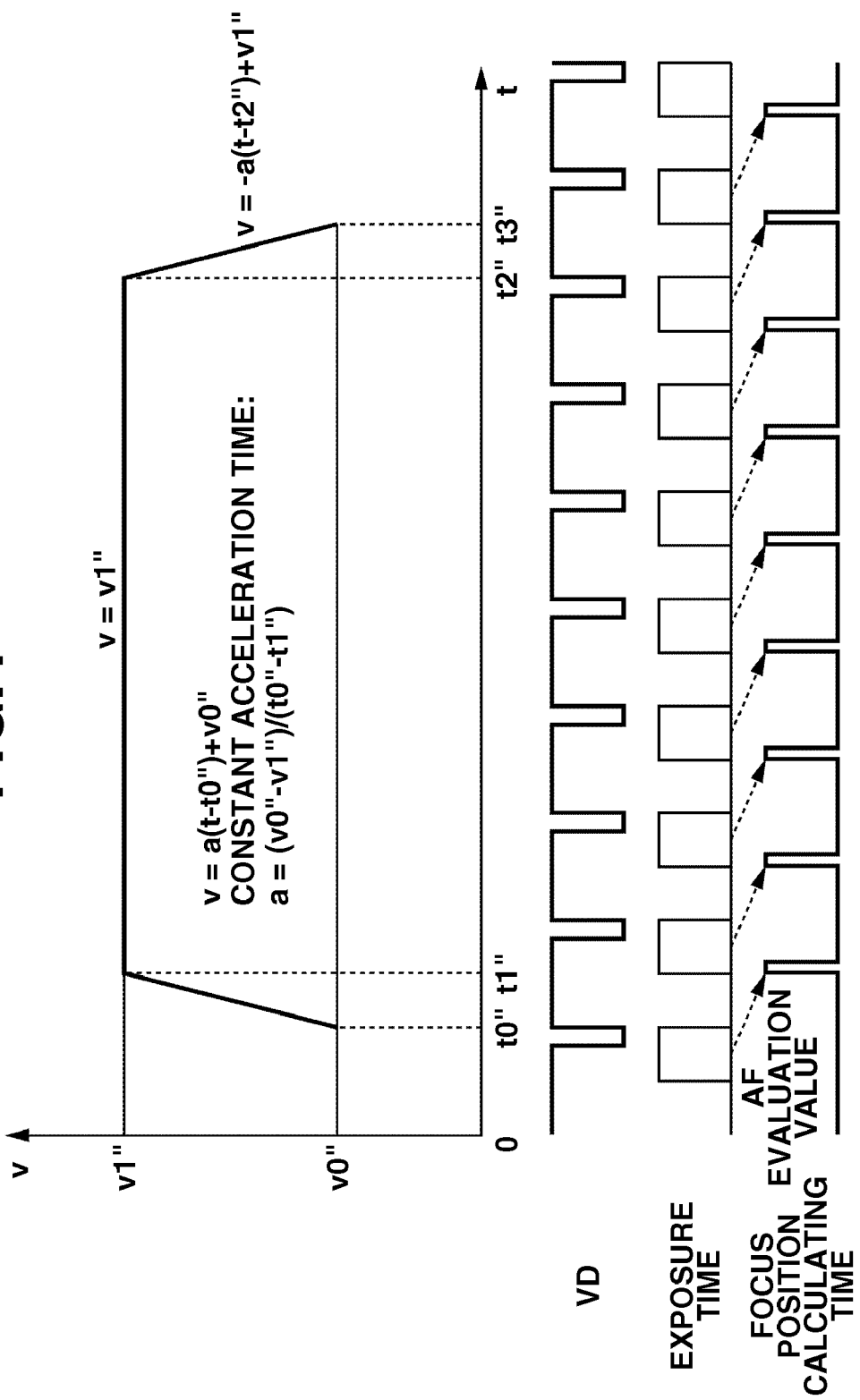
FIG. 4 is a view illustrating a change in velocity of a focus lens and the like achieved by a sweep time acceleration/deceleration function.

FIGS. 2 to 4 are views illustrating the drive velocities of the focus motor, acquisition timings of the AF evaluation value, and calculation timings of the central exposure position in different acceleration/deceleration modes of this embodiment. In uppermost portions of these figures, the abscissa indicates the time, and the ordinate indicates the velocity of the focus motor. In lower portions of these figures, there are illustrated vertical synchronization signals VD of the image sensing element determined from the synchronization signal, exposure times of the electronic shutter determined by the exposure control, and calculation times for calculating the central exposure position of the focus lens 105 in the exposure time. The timing of the vertical synchronization signal VD is a time for generating one image data (one frame), and a period of this timing is generally called a frame rate. As the frame rate increases, an image renewal period decreases so that a smooth moving video picture can be generated. In contrast, when a still picture is generated, it is necessary to lower the frame rate and prolong the exposure time in order to obtain a sufficient exposure amount even if an object image is dark. Further, as a result of the exposure control, upon determination of the frame rate and the exposure time, the sweep time for sweeping charge by the time of starting the exposure is set within one frame. The optical signal generated by the exposure in the sweep time is not converted into the video signal.

Further, the central exposure position is a position the focus lens passes at a center of the exposure time. This position is a representative value of positions of the focus lens at the time when the exposure is performed while the focus lens 105 is driven during the exposure time. This position of the focus lens can be obtained by calculation.

FIG. 2 shows an example in which the focus lens is driven at a predetermined constant velocity during a vertical synchronization time, and the acceleration drive is performed by increasing the velocity in a stepwise manner over plural vertical synchronization times according to a predetermined acceleration/deceleration function. Similarly, in the deceleration drive, the velocity is lowered in a stepwise manner over plural vertical synchronization times. During a time between 0 and t0 under a standstill condition, the central exposure position is a position of the focus lens at the time of starting the drive (an initial position of the focus lens described below). During a time between t0 and t1, the focus lens is driven at a constant velocity v=v0. The central exposure position Lc at this time can be written as Lc=L1−[v0*(T/2)] where L1 is the position of the focus lens at t1, and T is the exposure time. Similarly, also with respect to the time after t1, the central exposure position can be calculated by the first calculating portion using this calculation method. According to this method, the velocity of the focus lens remains unchanged during the exposure time, so that a calculation error of the central exposure position is relatively small, and a process time for the calculation is short. However, since plural vertical synchronization times are needed to reach the maximum velocity (target velocity), more time and longer distance for the acceleration/deceleration drive are needed, compared with other acceleration/deceleration modes described below.

FIG. 3 shows an example in which the velocity of the focus lens is accelerated in a uniform acceleration manner from an initial velocity to the target velocity in the vertical synchronization time according to a predetermined acceleration/deceleration function. Similarly, in the deceleration drive, the deceleration is performed by lowering the target velocity to a terminal velocity during the last vertical synchronization time. In this example, during a time between t0' and t1', the focus lens moves at a velocity v=a(t−t0')+v0' where a is an acceleration coefficient. Here, the central exposure position Lc' can be written as Lc'=L1'−[(½)*a*(T/2)$^2$+v1'*(T/2)] where L1' is the position of the focus lens at t1', and T is the exposure time. The central exposure position during a time when the drive is performed at a constant velocity after the target velocity is reached can be calculated using the calculation method used in the acceleration/deceleration mode of FIG. 2. According to the acceleration/deceleration mode of FIG. 3, since both the reaching to the target velocity and the deceleration from the target velocity can be performed in a vertical synchronization time, the acceleration/deceleration time can be decreased. Further, compared with the stepwise acceleration/deceleration mode, the maximum velocity can be made larger since the acceleration/deceleration drive is smoothly performed. However, compared with the stepwise acceleration/deceleration mode, since the acceleration/deceleration drive is executed in the exposure time, a calculation error is relatively large, and a process time for the calculation is relatively long.

FIG. 4 shows an example in which the velocity of the focus lens is accelerated in a uniform acceleration manner from an initial velocity to the target velocity during the sweep time in the vertical synchronization time according to a predetermined acceleration/deceleration function. Similarly, in the deceleration drive, the deceleration is performed by lowering the target velocity to a terminal velocity during the sweep time in the last vertical synchronization time. In this example, during a time between t0" and t1", the focus lens moves at a velocity v=a(t−t0")+v0" where a is an acceleration coefficient, similarly to the example of FIG. 3. However, since no exposure is performed during the sweep time, no AF evaluation value is acquired. Accordingly, the central exposure position can be calculated using only the calculation method used in the acceleration/deceleration mode of FIG. 2, after the target velocity v1" is reached. Therefore, this example enjoys both the advantages of methods of FIG. 2 and FIG. 3. In other words, the calculation precision increases due to a small calculation amount, and the drive can be performed at a higher maximum velocity. However, in the case where the vertical synchronization time is short and the exposure time is relatively long in the vertical synchronization time, the sweep time is shortened. As a result, when the acceleration drive needs to be executed at an acceleration larger than that the focus motor can take to reach the target velocity, this acceleration/deceleration mode cannot be adopted.

Accordingly, in this embodiment, it is possible to decrease the AF time and increase the AF precision by selecting the acceleration/deceleration mode from the three modes according to a situation. Naturally, in this embodiment, it is also possible to use any one of the three modes in a fixed manner, or to select the mode from any two of the three modes according to a situation.

Figure 5:
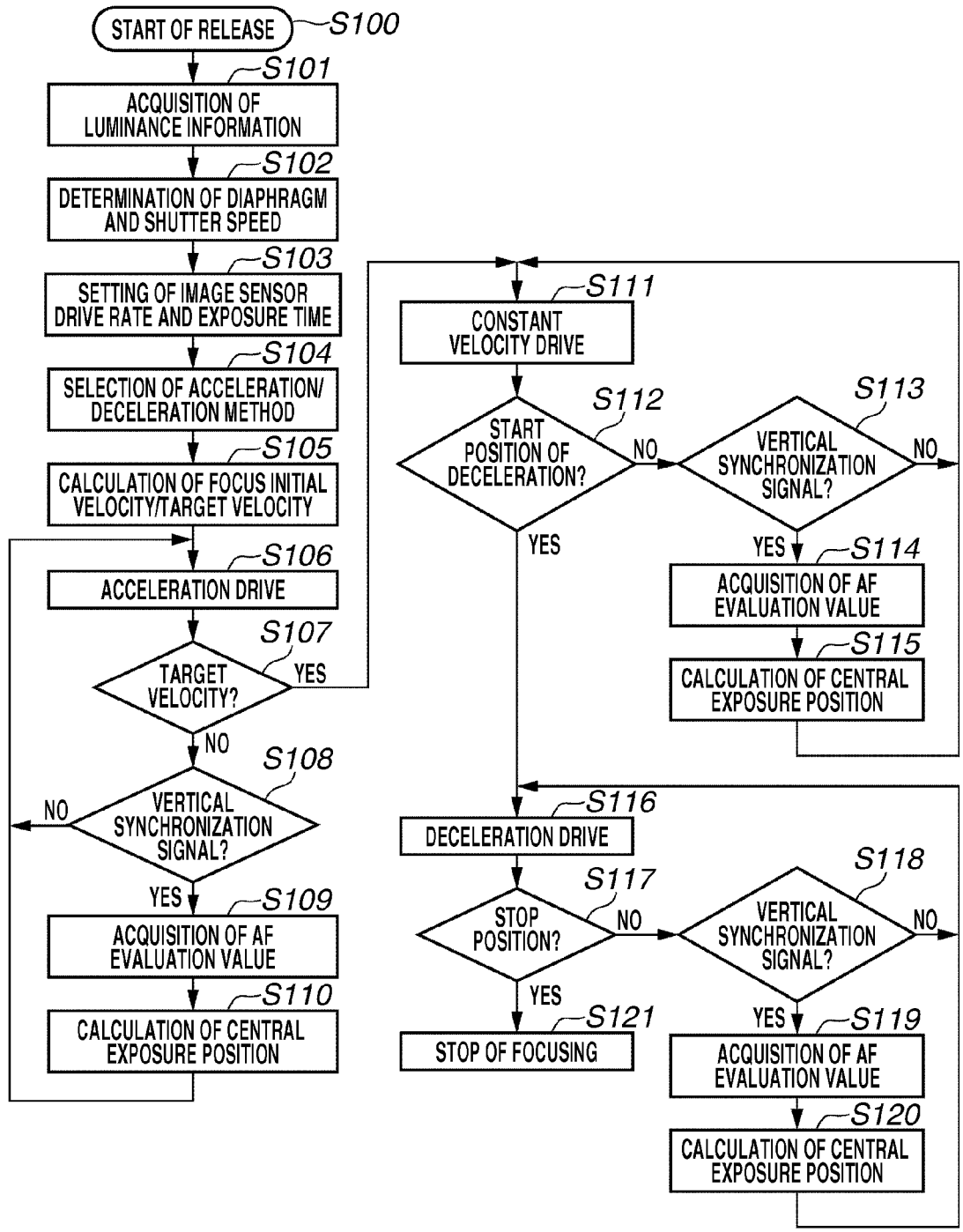
FIG. 5 is a flowchart of an exemplary AF control using an acceleration/deceleration function.

FIG. 5 shows a flowchart of an exemplary operation in which the focus position corresponding to a peak of the AF evaluation value is detected in the AF control using the acceleration/deceleration drive of the focus motor. In FIG. 5, when a user pushes down the release button to start the release (S100), the automatic exposure control is initially started. Luminance information of the video signal is acquired from the image processing circuit 113 (S101), and the diaphragm and the shutter speed are determined based on the luminance information to achieve an appropriate exposure value (S102). Further, based on the shutter speed, determination of the drive rate (frame rate) of the image sensing element 111, which is the timing of the vertical synchronization signal VD, and the exposure time is performed (S103). Then, the acceleration/deceleration method is selected from among the stepwise acceleration/deceleration, the vertical synchronization time acceleration/deceleration, and the sweep time acceleration/deceleration (S104). Further, according to the selected acceleration/deceleration method, initial velocity and target velocity at the time of the acceleration/deceleration drive are calculated (S105). The selection method of the acceleration/deceleration method and the calculation method f the target velocity will be described later.

Upon determination of the acceleration/deceleration, the acceleration drive is started (S106), and the acquisition of the AF evaluation value is started. At this time, the focus lens 105 is moved to the initial position according to conditions such as the focal length determined by the zoom lens 102 controlled by the zoom control portion 106, and the like. Under such conditions, in the case where the acceleration drive is performed over plural vertical synchronization times, a change in the vertical synchronization signal VD occurs in the acceleration drive (S108). At this time, the AF evaluation value is acquired (S109), and the central exposure position is calculated (S110). Upon the velocity of the focus motor reaching the target position (S107), the step proceeds to the constant velocity drive (S111). During the constant velocity drive, arrival at the deceleration start position is monitored (S112). When a change in the vertical synchronization signal VD is detected (S113) during the constant velocity drive, the AF evaluation value is acquired (S114), and the central exposure position is calculated (S115).

Upon the focus lens reaching the deceleration start position, the deceleration drive is started (S116). During the deceleration drive, when a change in the vertical synchronization signal VD is detected (S118), the AF evaluation value is acquired (S119), and the central exposure position is calculated (S120), similarly to the acceleration drive. Upon the focus lens reaching a stop position (S117), the focus lens 105 is brought to a standstill (121). The scan operation of the focus lens is thus executed, and a peak value is detected from the AF evaluation values acquired during the scan operation. The focus lens 105 is moved to a focus position (in-focus position) corresponding to the peak value, so that a focused image can be obtained. Also in the case where the vertical synchronization time acceleration/deceleration mode or sweep time acceleration/deceleration mode is selected, the scan operation proceeds in approximately the same way.

The calculation method of the drive velocity (target velocity) of the focus motor will be described. The drive velocity of the focus lens 105 is sought by calculating a velocity as follows. That is, when the focus lens moves at this velocity during one frame, the focus lens can move by a certain depth of field. The depth of field is an allowable in-focus range of the focus lens 105 for an object at a certain distance. In the case where no focus shift appears even when the focus lens 105 shifts for a pixel pitch of the image sensing element 111, it can be said that the position of the focus lens is in the same depth of field. The drive velocity is sought as follows. After how many depths are scanned during one frame at the focal length at the time of the AF operation is determined, the velocity can be obtained by calculating the sampling time and the focus pulse amount equivalent to the depth from the frame rate. For example, in the case where five (5) depths are scanned by the focus lens at a constant velocity during one frame at 30 fps (frame/second), the focus lens is moved at a velocity of (5*10)/(1/30)=1500 pps (pulse/second) when the focal length is such that makes one depth equal to ten (10) pulses. When the target velocity is set at the above velocity and the initial velocity is set at a certain velocity below a velocity of the frequency of starting characteristics of the pulse motor, the acceleration at this time can be obtained since the acceleration time is the vertical synchronization time or the sweep time. The deceleration can also be obtained similarly. In this description, assuming that the focus motor is a stepping motor, the moving amount of the focus lens and the lens position from the initial position are referred to as the focus pulse amount, the pulse or the like. Accordingly, in the case where the focus motor is a motor such as a linear motor, those terms are expressed as the moving amount, the focus lens position, or the like.

Figure 6:
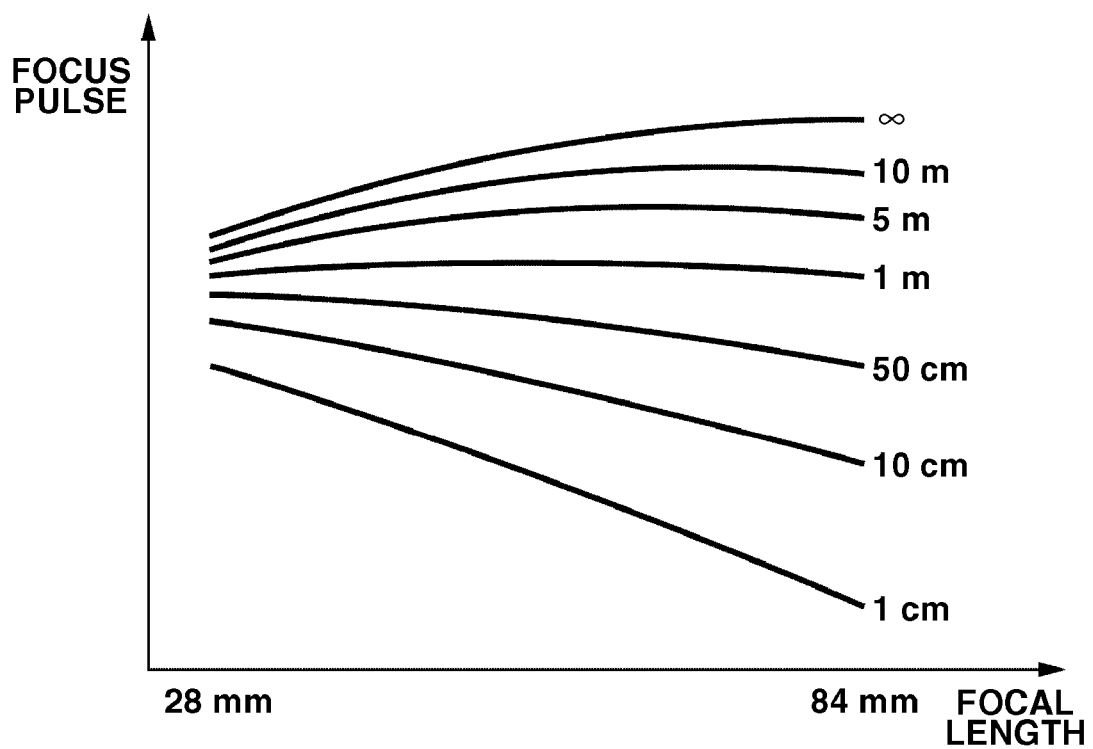
FIG. 6 is a graph showing the relationship between a focus pulse position (in-focus position) and a focal length.

Even for the same object distance, the focus pulse position (in-focus position) varies depending on the focal length. FIG. 6 illustrates the relationship between the focal length and the focus pulse at the in-focus position. The abscissa indicates the focal length, and the ordinate indicates the focus pulse position. A curve indicates the focus pulse position for the same object distance. It can be seen from FIG. 5 that the focus pulse at the in-focus position varies according to the focal length. Further, even when a scan range is a range between the same object distances, the moving amount (pulse amount) scanned by the focus lens 105 varies depending on the focal length. For example, even when the scan is performed over the same range between 1 cm and 10 cm, the pulse amount of the focus lens with a focal length of 28 mm defers from that with a focal length of 84 mm. Accordingly, the scan range varies according to the focal length, and hence the scan time also varies.

In order to decrease the detecting time of the peak position and further enhance the precision, the scan operation can be executed in the following manner. That is, the coarse scan (first peak-position detecting mode) is initially performed. In the coarse scan, the drive velocity of the focus motor is set at a high speed to coarsely detect the focus position (in-focus position). Then, the fine scan (second peak-position detecting mode) is performed. In the fine scan, the fine scan is performed by moving the focus lens at a low speed around the focus position coarsely detected in the coarse scan to detect the focus position (in-focus position).

Figure 7A:
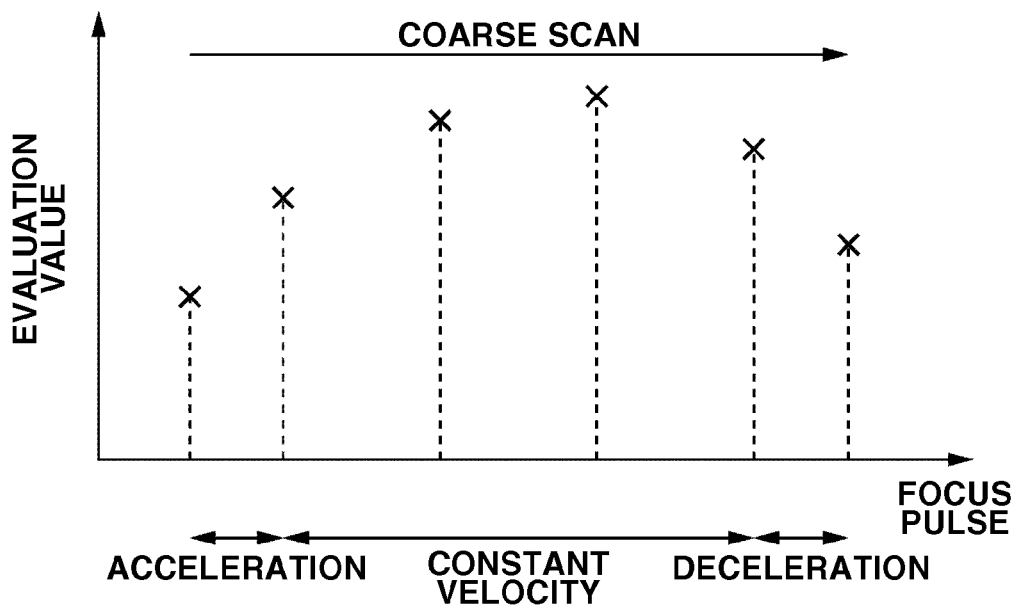
FIGS. 7A and 7B are graphs showing a coarse scan and a fine scan.
Figure 7B:
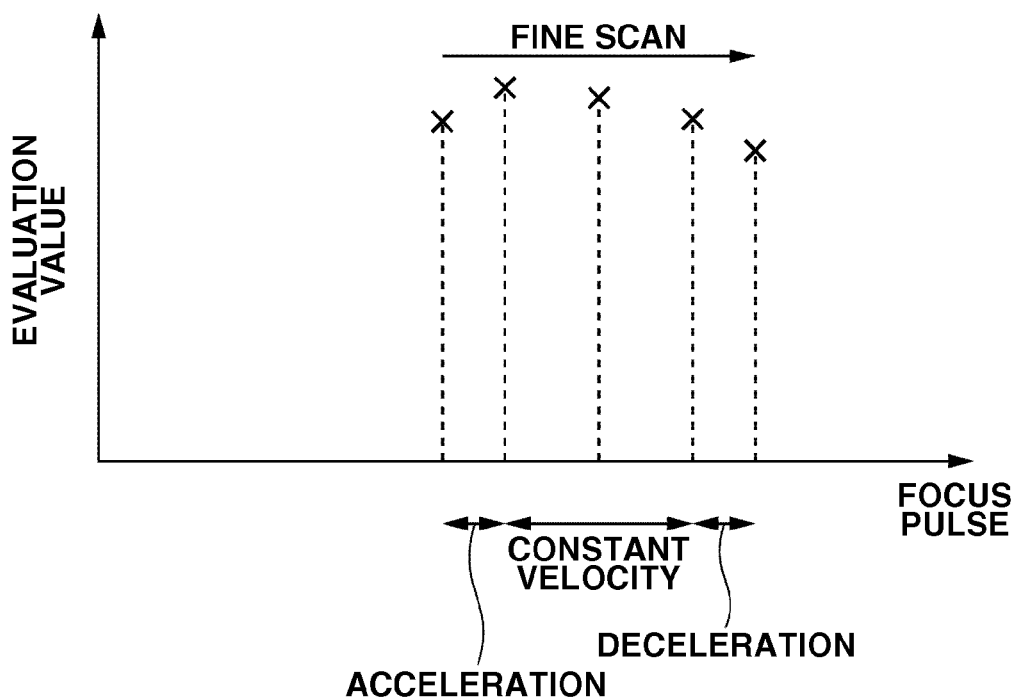

FIGS. 7A and 7B show scan intervals for acquisition of AF evaluation values in the coarse scan and the fine scan, respectively. Since the interval for sampling the AF evaluation value is determined from the frame rate decided by the exposure control, the sampling interval is an interval determined thereby. The sampling interval thus remains unchanged irrespective of the velocity of the focus motor, so that the inter-sampling moving amount (pulse amount) of the focus lens is relatively short during the acceleration/deceleration drive, compared with the inter-sampling moving amount (pulse amount) during the drive at the target velocity. Further, it can be seen that the inter-sampling pulse amount of the focus lens is relatively small during the fine scan, compared with the inter-sampling pulse amount during the coarse scan. Therefore, when the position of the focus lens corresponding to the peak position of the AF evaluation value in the fine scan is adopted as a final in-focus position, a precision of the in-focus position can be enhanced. Further, there is no need to move the focus lens at a low drive velocity in the fine scan over the total distance moving amount. Accordingly, a time for detecting the peak position can be decreased.

Selection process of the above-described acceleration/deceleration method will be described with reference to FIG. 8. In this selection process, the step proceeds to a selection step S200 in FIG. 8 at the time of the selection step S104 in FIG. 5. Initially, whether the scan is the coarse scan or the fine scan is judged (S201). In the case of the fine scan, the acceleration/deceleration operation is performed in the stepwise acceleration/deceleration drive mode (S203) since the precision is required. In the case of the coarse scan, whether the velocity can reach the target velocity in the sweep time is further judged (S202). As a result, when it is judged that the velocity can reach the target velocity within the sweep time, the acceleration/deceleration operation is performed in the sweep time (S204). If not, the acceleration/deceleration operation is performed in the vertical synchronization time (S205).

Further, when the frame rate increases and the vertical synchronization time turns to be shorter than a time in which the velocity can reach the target velocity, the acceleration/deceleration operation is performed over plural vertical synchronization times. And, the AF evaluation value is acquired during the acceleration/deceleration drive. Here, the coarse scan is executed when the precision is not so much required, while the fine scan is executed when the precision is required, for example. Alternatively, these scans can be sequentially performed. For example, after the coarse scan is finished, the step is returned to the step S104 in FIG. 5 to execute the fine scan.

As is described in the foregoing, the peak position detecting time can be decreased by using the acceleration/deceleration operation of the focus motor in the AF control. Further, it is possible to decrease the detecting time without lowering the precision by changing the acceleration/deceleration drive mode according to the scan method and the acceleration/deceleration time. Furthermore, in the above-discussed embodiment, the uniform acceleration/deceleration (linear) function and step function are used, but acceleration/deceleration functions of multi-order curves (second or more order curves) and acceleration/deceleration functions with given patterns can also be used. In such AF control, it is possible to achieve such advantageous effects that operation noises at the drive starting or stopping time can be reduced, and that the capacity of ROM for storing the acceleration/deceleration pattern as a function (not as a table) can be reduced.

Except as otherwise discussed herein, the various components shown in outline or in block form in the Figures are individually well known and their internal construction and operation are not critical either to the making or using, or to a description of the best mode of the invention.

This application claims the benefit of Japanese Patent Application No. 2008-260419, filed Oct. 7, 2008, which is hereby incorporated by reference herein in its entirety.

What is claimed is:

1. An automatic focusing apparatus for performing focus adjustment of an object image by driving a focus lens along an optical-axis direction, the automatic focusing apparatus comprising:
   an image pickup portion for converting an optical signal of an object image into an electric video signal by an image sensing element;
   an evaluating portion for calculating an evaluation value from the video signal obtained by the image pickup portion;
   a focus motor for driving the focus lens;
   an exposure controlling portion for calculating an exposure amount of the image pickup portion;
   a first calculating portion; and
   a drive controlling portion for controlling an acceleration/deceleration drive of the focus motor according to a predetermined acceleration/deceleration function,
   wherein the drive controlling portion accelerates the drive of the focus motor up to a target velocity and decelerates the drive of the focus motor from the target velocity after the target velocity is reached in synchronization with a synchronization signal for generating a timing of starting exposure for the optical signal of the image pickup portion,
   wherein the drive controlling portion is constructed in such a manner that a first acceleration/deceleration mode, in which a velocity of the focus motor is accelerated up to the target velocity and decelerated from the target velocity after the target velocity is reached in synchronization with the synchronization signal in a vertical synchronization time of the image sensing element, and a second acceleration/deceleration mode, in which the velocity of the focus motor is accelerated up to the target velocity and decelerated from the target velocity after the target velocity is reached in synchronization with the synchronization signal in a charge sweep time of the image sensing element within the vertical synchronization time of the image sensing element determined from the exposure amount calculated by the exposure controlling portion, can be selectively executed, and
   wherein the drive controlling portion selects the first acceleration/deceleration mode or the second acceleration/deceleration mode based on times calculated by the first calculating portion, in which the target velocity is reached in the first acceleration/deceleration mode and the second acceleration/deceleration mode, respectively, and the charge sweep time of the image sensing element.

2. The automatic focusing apparatus according to claim 1, wherein the drive controlling portion continuously performs the acceleration/deceleration drive of the focus motor according to the acceleration/deceleration function.

3. The automatic focusing apparatus according to claim 1, wherein the drive controlling portion controls the acceleration/deceleration drive of the focus motor in such a manner that the velocity of the focus motor is accelerated up to the target velocity and decelerated from the target velocity after the target velocity is reached in a stepwise manner in synchronization with the synchronization signal over plural vertical synchronization times.

4. The automatic focusing apparatus according to claim 1, further comprising:
   a detecting portion for detecting the position of the focus lens; and
   a second calculating portion for calculating the position of the focus lens, at which the evaluating portion acquires the evaluation value, based on a signal from the detecting portion,
   wherein the second calculating portion calculates positions of the focus lens corresponding to respective evaluation values obtained during the acceleration/deceleration drive by using the acceleration/deceleration function of the drive controlling portion.

5. The automatic focusing apparatus according to claim 1, wherein the drive controlling portion is constructed in a such a manner that a first peak-position detecting mode, in which the focus lens is moved at a first target velocity to coarsely detect the focus position, and a second peak-position detecting mode, in which the focus lens is moved at a second target velocity lower than the first target velocity around the focus position detected in the first peak-position detecting mode to finely detect the focus position, can be selectively executed.

6. An automatic focusing apparatus for performing focus adjustment of an object image by driving a focus lens along an optical-axis direction, the automatic focusing apparatus comprising:
   an image pickup portion for converting an optical signal of an object image into an electric video signal by an image sensing element;
   an evaluating portion for calculating an evaluation value from the video signal obtained by the image pickup portion;
   a focus motor for driving the focus lens;
   a drive controlling portion for controlling an acceleration/deceleration drive of the focus motor according to a predetermined acceleration/deceleration function; and
   an exposure controlling portion for calculating an exposure amount of the image pickup portion,
   wherein the drive controlling portion accelerates the drive of the focus motor up to a target velocity, and decelerates the drive of the focus motor from the target velocity after the target velocity is reached, in synchronization with a synchronization signal for generating a timing of starting exposure for the optical signal of the image pickup portion,
   wherein the drive controlling portion is constructed in such a manner that a first peak-position detecting mode, in which the focus lens is moved at a first target velocity to coarsely detect a focus position, and a second peak-position detecting mode, in which the focus lens is moved at a second target velocity lower than the first target velocity around the focus position detected in the first peak-position detecting mode to finely detect the focus position, can be selectively executed, and
   wherein the drive controlling portion is constructed in such a manner that, when the first peak-position detecting mode is performed, the drive controlling portion controls the acceleration/deceleration drive of the focus motor in such a manner that the velocity of the focus motor is accelerated up to the target velocity and decelerated from the target velocity after the target velocity is reached in synchronization with the synchronization signal in the vertical synchronization time of the image sensing element or in a charge sweep time within the vertical synchronization time determined from an exposure amount calculated by the exposure controlling portion, and, when the second peak-position detecting mode is performed, the drive controlling portion controls the acceleration/deceleration drive of the focus motor in such a manner that the velocity of the focus motor is accelerated up to the target velocity and decelerated from the target velocity after the target velocity is reached in synchronization with the synchronization signal in a stepwise manner over plural vertical synchronization times of the image sensing element.

7. The automatic focusing apparatus according to claim 6, wherein the drive controlling portion continuously performs the acceleration/deceleration drive of the focus motor according to the acceleration/deceleration function.

8. The automatic focusing apparatus according to claim 6, wherein the drive controlling portion controls the acceleration/deceleration drive of the focus motor in such a manner that the velocity of the focus motor is accelerated up to the target velocity and decelerated from the target velocity after the target velocity is reached in a stepwise manner in synchronization with the synchronization signal over plural vertical synchronization times.

9. The automatic focusing apparatus according to claim 6, further comprising:

a detecting portion for detecting the position of the focus lens; and a first calculating portion for calculating the position of the focus lens, at which the evaluating portion acquires the evaluation value, based on a signal from the detecting portion, wherein the first calculating portion calculates positions of the focus lens corresponding to respective evaluation values obtained during the acceleration/deceleration drive by using the acceleration/deceleration function of the drive controlling portion.

* * * * *